(12) United States Patent
King et al.

(10) Patent No.: US 8,139,100 B2
(45) Date of Patent: Mar. 20, 2012

(54) VIRTUAL MULTIWAY SCALER COMPENSATION

(75) Inventors: Keith C. King, Austin, TX (US); Wayne E. Mock, Round Rock, TX (US)

(73) Assignee: LifeSize Communications, Inc., Austin, TX (US)

( * ) Notice: Subject to any disclaimer, the term of this patent is extended or adjusted under 35 U.S.C. 154(b) by 921 days.

(21) Appl. No.: 12/171,358

(22) Filed: Jul. 11, 2008

(65) Prior Publication Data

US 2009/0015661 A1    Jan. 15, 2009

Related U.S. Application Data

(60) Provisional application No. 60/949,674, filed on Jul. 13, 2007.

(51) Int. Cl.
*H04N 7/14* (2006.01)

(52) U.S. Cl. .................. 348/14.09; 348/14.08

(58) Field of Classification Search ............. 348/14.01, 348/14.05, 14.07, 14.08, 14.09, 14.1, 14.12
See application file for complete search history.

(56) References Cited

U.S. PATENT DOCUMENTS

| | | | |
|---|---|---|---|
| 4,686,698 A | 8/1987 | Tompkins et al. |
| 4,893,326 A | 1/1990 | Duran et al. |
| 5,014,267 A | 5/1991 | Tompkins et al. |
| 5,239,623 A | 8/1993 | Sato et al. |
| 5,365,265 A | 11/1994 | Shibata et al. |
| 5,374,952 A | 12/1994 | Flohr |
| 5,382,972 A | 1/1995 | Kannes |
| 5,398,309 A | 3/1995 | Atkins et al. |
| 5,453,780 A | 9/1995 | Chen et al. |
| 5,515,099 A | 5/1996 | Cortjens et al. |
| 5,528,740 A | 6/1996 | Hill et al. |
| 5,534,914 A | 7/1996 | Flohr et al. |
| 5,537,440 A | 7/1996 | Eyuboglu et al. |
| 5,572,248 A | 11/1996 | Allen et al. |
| 5,581,671 A | 12/1996 | Goto et al. |

(Continued)

FOREIGN PATENT DOCUMENTS

JP    5181639    7/1993

OTHER PUBLICATIONS

"Eye-to-Eye Video"; Retrieved from the Internet: http://itotd.com/articles/254/eye-to-eye-video/; Jul. 23, 2004; 6 pages.

(Continued)

*Primary Examiner* — Suhan Ni
(74) *Attorney, Agent, or Firm* — Meyertons Hood Kivlin Kowert & Goetzel, P.C.; Jeffrey C. Hood

(57) ABSTRACT

In various embodiments, a multipoint control unit (MCU) may arrange incoming video images into a composite video image and define their respective coordinate information including the size of the original composite video image. The MCU may subsequently scale the composite video image. The coordinate information for the scaled composite video image may be reformatted for the resized video images. When the endpoint receives the scaled composite video image, the endpoint may detect the actual size of the scaled composite video image and may determine the new coordinates of the video images in the scaled composite video image using a ratio of the size of the original composite video image to the actual size detected by the endpoint. These new coordinates may then be used to separate the images in the scaled composite video image to use in compositing a new composite video image.

25 Claims, 16 Drawing Sheets

U.S. PATENT DOCUMENTS

| | | | |
|---|---|---|---|
| 5,594,859 A | 1/1997 | Palmer et al. |
| 5,600,646 A | 2/1997 | Polomski |
| 5,617,539 A | 4/1997 | Ludwig et al. |
| 5,625,410 A | 4/1997 | Washino et al. |
| 5,629,736 A | 5/1997 | Haskell et al. |
| 5,640,543 A | 6/1997 | Farrell et al. |
| 5,649,055 A | 7/1997 | Gupta et al. |
| 5,657,096 A | 8/1997 | Lukacs |
| 5,684,527 A | 11/1997 | Terui et al. |
| 5,689,641 A | 11/1997 | Ludwig et al. |
| 5,719,951 A | 2/1998 | Shackleton et al. |
| 5,737,011 A | 4/1998 | Lukacs |
| 5,751,338 A | 5/1998 | Ludwig, Jr. |
| 5,764,277 A | 6/1998 | Loui et al. |
| 5,767,897 A | 6/1998 | Howell |
| 5,812,789 A | 9/1998 | Diaz et al. |
| 5,821,986 A | 10/1998 | Yuan et al. |
| 5,831,666 A | 11/1998 | Palmer et al. |
| 5,838,664 A | 11/1998 | Polomski |
| 5,841,763 A | 11/1998 | Leondires et al. |
| 5,859,979 A | 1/1999 | Tung et al. |
| 5,870,146 A | 2/1999 | Zhu |
| 5,896,128 A | 4/1999 | Boyer |
| 5,900,907 A | 5/1999 | Malloy et al. |
| 5,914,940 A | 6/1999 | Fukuoka et al. |
| 5,990,931 A | 11/1999 | Nimri et al. |
| 5,995,608 A | 11/1999 | Detampel, Jr. et al. |
| 6,038,532 A | 3/2000 | Kane et al. |
| 6,043,844 A | 3/2000 | Bist et al. |
| 6,049,694 A | 4/2000 | Kassatly |
| 6,078,350 A | 6/2000 | Davis |
| 6,101,480 A | 8/2000 | Conmy et al. |
| 6,122,668 A | 9/2000 | Teng et al. |
| 6,128,649 A | 10/2000 | Smith et al. |
| 6,160,573 A | 12/2000 | Allen et al. |
| 6,195,184 B1 | 2/2001 | Chao et al. |
| 6,243,129 B1 | 6/2001 | Deierling |
| 6,281,882 B1 | 8/2001 | Gordon et al. |
| 6,285,661 B1 | 9/2001 | Zhu et al. |
| 6,288,740 B1 | 9/2001 | Lai et al. |
| 6,292,204 B1 | 9/2001 | Carleton et al. |
| 6,300,973 B1 | 10/2001 | Feder et al. |
| 6,314,211 B1 | 11/2001 | Kim et al. |
| 6,373,517 B1 | 4/2002 | Davis et al. |
| 6,400,996 B1 | 6/2002 | Hoffberg et al. |
| 6,453,285 B1 | 9/2002 | Anderson et al. |
| 6,480,823 B1 | 11/2002 | Zhao et al. |
| 6,496,216 B2 | 12/2002 | Feder et al. |
| 6,526,099 B1 | 2/2003 | Christopoulos et al. |
| 6,535,604 B1 | 3/2003 | Provencal et al. |
| 6,564,380 B1 | 5/2003 | Murphy |
| 6,590,604 B1 | 7/2003 | Tucker et al. |
| 6,594,688 B2 | 7/2003 | Ludwig et al. |
| 6,603,501 B1 | 8/2003 | Parry et al. |
| 6,646,997 B1 | 11/2003 | Baxley et al. |
| 6,654,045 B2 | 11/2003 | Allen et al. |
| 6,657,975 B1 | 12/2003 | Baxley et al. |
| 6,728,221 B1 | 4/2004 | Shaffer et al. |
| 6,744,460 B1 | 6/2004 | Nimri et al. |
| 6,757,005 B1 | 6/2004 | Elbaz et al. |
| 6,760,415 B2 | 7/2004 | Beecroft |
| 6,774,928 B2 | 8/2004 | Bruzzone |
| 6,813,083 B2 | 11/2004 | Kobayashi |
| 6,816,904 B1 | 11/2004 | Ludwig et al. |
| 6,847,403 B1 | 1/2005 | Forsberg, Jr. et al. |
| 6,909,552 B2 | 6/2005 | Dohi et al. |
| 6,944,259 B2 | 9/2005 | Yang |
| 6,967,321 B2 | 11/2005 | Leong et al. |
| 7,089,285 B1 | 8/2006 | Drell |
| 7,133,062 B2 | 11/2006 | Castles et al. |
| 7,312,809 B2 | 12/2007 | Bain et al. |
| 7,339,605 B2 | 3/2008 | Rodman et al. |
| 2002/0133247 A1 | 9/2002 | Smith et al. |
| 2002/0188731 A1 | 12/2002 | Potekhin et al. |
| 2003/0174146 A1 | 9/2003 | Kenoyer |
| 2003/0232648 A1 | 12/2003 | Prindle |
| 2004/0183897 A1 | 9/2004 | Kenoyer et al. |
| 2005/0198134 A1 | 9/2005 | Kenoyer et al. |
| 2006/0013416 A1 | 1/2006 | Truong et al. |
| 2006/0087553 A1 | 4/2006 | Kenoyer |
| 2006/0244817 A1 | 11/2006 | Harville et al. |
| 2006/0259552 A1 | 11/2006 | Mock |
| 2006/0277254 A1 | 12/2006 | Kenoyer et al. |
| 2007/0009113 A1 | 1/2007 | Kenoyer |
| 2007/0009114 A1 | 1/2007 | Kenoyer et al. |
| 2007/0165106 A1 | 7/2007 | Groves et al. |

OTHER PUBLICATIONS

"Free2C 3D-Display" (web archive: http://www.hhi.fraunhofer.de/english/im/products/Cebit/free2C/free2C.html dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpe ech Press.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of The International Society for Optical Engineering; May 1997; p. 12.

Jefferson Han and Brian Smith; "CU-SeeMe VR Immersize Desktop Teleconferencing"; Proceeding of the Fourth ACM international conference on Multimedia; 1997; pp. 199-207.

David McAllister; "Display Technology: Stereo & 3D Display Technologies" North Carolina State University, http://web.archive.org/web/20031206213341/http://research.csc.ncsu.edu/stereographics/wiley.pdf (date or web archive Dec. 6, 2003); 50 pages.

Alexander Sawchuk, Isaac Cohen, Chris Kyriakakis, and Albert Rizzo; "Three Dimensional Interaction with Autostereoscopic Displays" (date unknown); 8 pages.

Lars Weinand; "3D Stereo Technology: Is it Ready for Prime Time?"; http://www.tomshardware.com/2005/05/02/3d_stereo_technology; May 2, 2005; 40 pages.

"Technical Handbook"; North Dakota Interactive Video Network; Jan. 2003; 38 pages.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing-An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Aurel A. Lazar and Koon-Seng Lim; "Programmability and Service Creation for Multimedia Networks"; Fifth IEEE International Symposium on High Performance Distributed Computing; 1996; pp. 217-223.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

U.S. Appl. No. 12/142,263, entitled "Virtual decoders", by King, et al., filed on Jun. 19, 2008.

U.S. Appl. No. 12/142,302, entitled "Video Conferencing System which Allows Endpoints to Perform Continuous Presence Layout Selection", by King, et al., filed on Jun. 19, 2008.

U.S. Appl. No. 12/142,340, entitled "Video Conferencing Device which Performs Multi-way Conferencing", by King, et al., filed on Jun. 19, 2008.

U.S. Appl. No. 12/142,377, entitled "Video Decoder which Processes Multiple Video Streams", by King, et al., filed on Jun. 19, 2008.

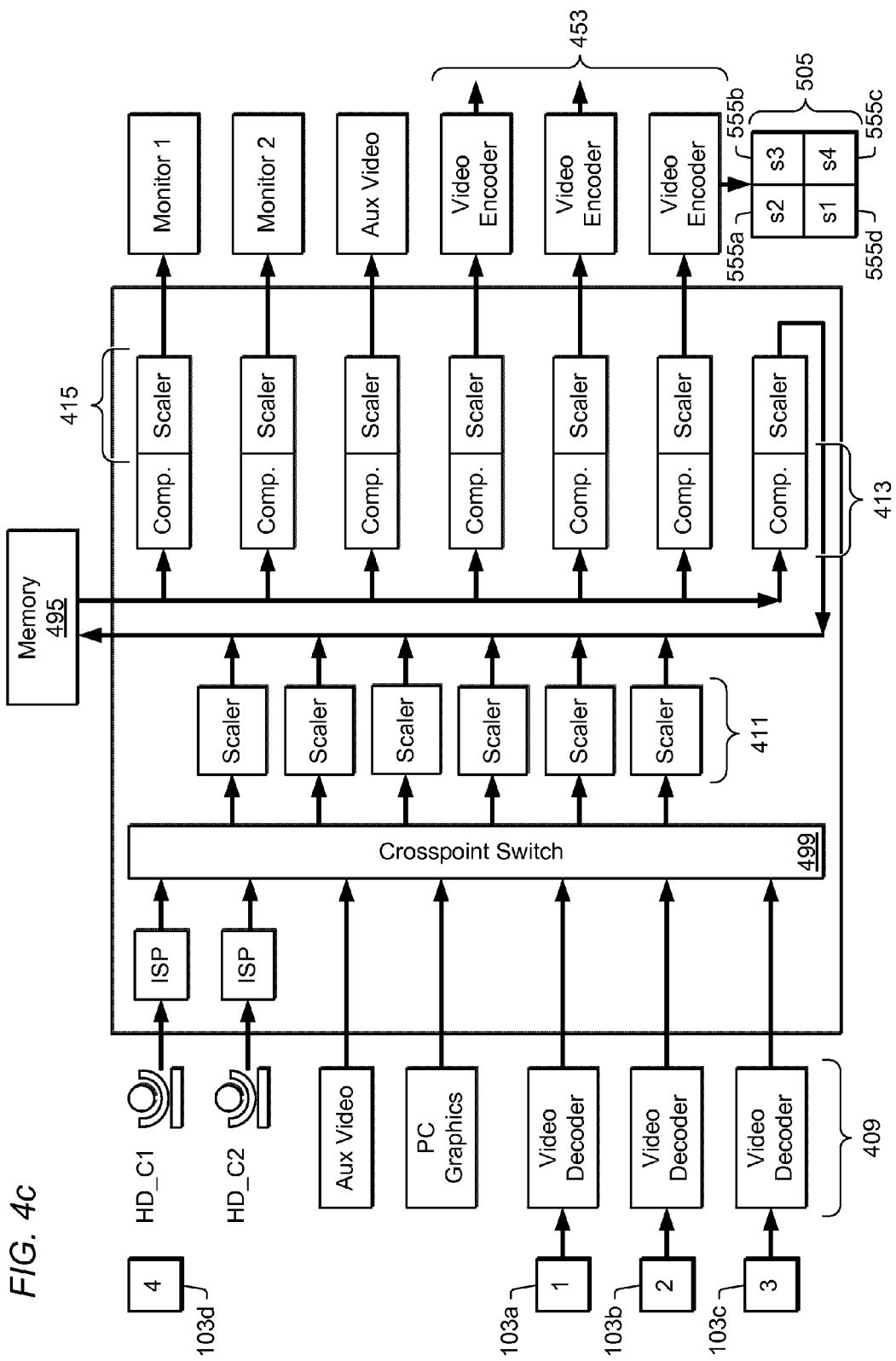

VIRTUAL MULTIWAY SCALER COMPENSATION

PRIORITY

This application claims the benefit of priority of U.S. Provisional Patent Application titled "Virtual Multiway Scaler Compensation", Ser. No. 60/949,674, which was filed Jul. 13, 2007, whose inventors are Keith C. King and Wayne E. Mock, which is hereby incorporated by reference in its entirety as though fully and completely set forth herein.

BACKGROUND OF THE INVENTION

1. Field of the Invention

The present invention relates generally to conferencing and, more specifically, to video conferencing.

2. Description of the Related Art

Video conferencing may be used to allow two or more participants at remote locations to communicate using both video and audio. Each participant location may include a video conferencing endpoint for video/audio communication with other participants. Each video conferencing endpoint may include a camera and microphone to collect video and audio from a first or local participant to send to another (remote) participant. Each video conferencing endpoint may also include a display and speaker to reproduce video and audio received from a remote participant. Each video conferencing endpoint may also be coupled to a computer system to allow additional functionality into the video conference. For example, additional functionality may include data conferencing (including displaying and/or modifying a document for two or more participants during the conference).

Video conferencing involves transmitting video streams between video conferencing endpoints. The video streams transmitted between the video conferencing endpoints may include video frames. The video frames may include pixel macroblocks that may be used to construct video images for display in the video conferences. Video frame types may include intra-frames, forward predicted frames, and bi-directional predicted frames. These frame types may involve different types of encoding and decoding to construct video images for display. Currently, in a multi-way video conference call, a multipoint control unit (MCU) may composite video images received from different video conferencing endpoints onto video frames of a video stream that may be encoded and transmitted to the various video conferencing endpoints for display.

SUMMARY OF THE INVENTION

In various embodiments, an MCU or another video conferencing device (e.g., an endpoint) may generate a video frame that includes video images of two or more video conferencing endpoints. The MCU may also transmit coordinate information along with the video frame (e.g., as metadata). The metadata may include video image identifiers and location information (e.g., coordinates in the video frame) of the video images. The video frame may then be sent to a video conferencing endpoint that may receive the video frame and separate the two or more video images into separate video images. In some embodiments, the coordinate information sent along with the video frame may be used by the video conferencing endpoint to determine the locations of the video images in the video frame to facilitate separation of the video images.

In some embodiments, after the video conferencing endpoint separates out the video images, the separated video images may be provided to a compositor that may composite the separated video images into a composite video image with the new video image layout. Other video images (e.g., from local video or received from other video conferencing endpoints) may also be composited into the new video image layout. In some embodiments, the new video image layout may be configured to be displayed (e.g., as a continuous presence image). In some embodiments, participants at each video conferencing endpoint may use their local video conferencing endpoints to customize their continuous presence layout. For example, participants may rearrange the video images and/or replace one or more video images in the video image layout (e.g., with a current video image from their local video source).

In some embodiments, the MCU may arrange the incoming video images into a composite video image with a requested video image layout and define the respective coordinate information for one or more of the video images in the composite video image including the size of the original composite video image. In some embodiments, the MCU may need to subsequently scale the composite video image (e.g., scale down the composite video image to be sent over a reduced bandwidth network connection) to be sent to one or more endpoints. In some embodiments, the composite video image may be scaled to a scaled composite video image in a scaler. The coordinate information may be included in metadata passed with a video frame that includes the scaled composite video image. In some embodiments, the coordinate information may be reformatted (e.g., at the MCU or at the receiving endpoint) to reflect the new coordinates of one or more of the resized video images in the scaled composite video image. For example, when the endpoint receives the scaled composite video image, the endpoint may detect the actual size of the scaled composite video image and may determine the new coordinates of one or more of the video images in the scaled composite video image using, for example, a ratio of the size of the original composite video image to the size of the scaled composite video image detected by the endpoint. These new coordinates may then be used to separate one or more of the resized images in the scaled composite video image to use in compositing a new composite video image.

BRIEF DESCRIPTION OF THE DRAWINGS

FIGS. 4a-d illustrates an MCU transmitting a video frame including multiple video images, according to an embodiment.

Figure 1:
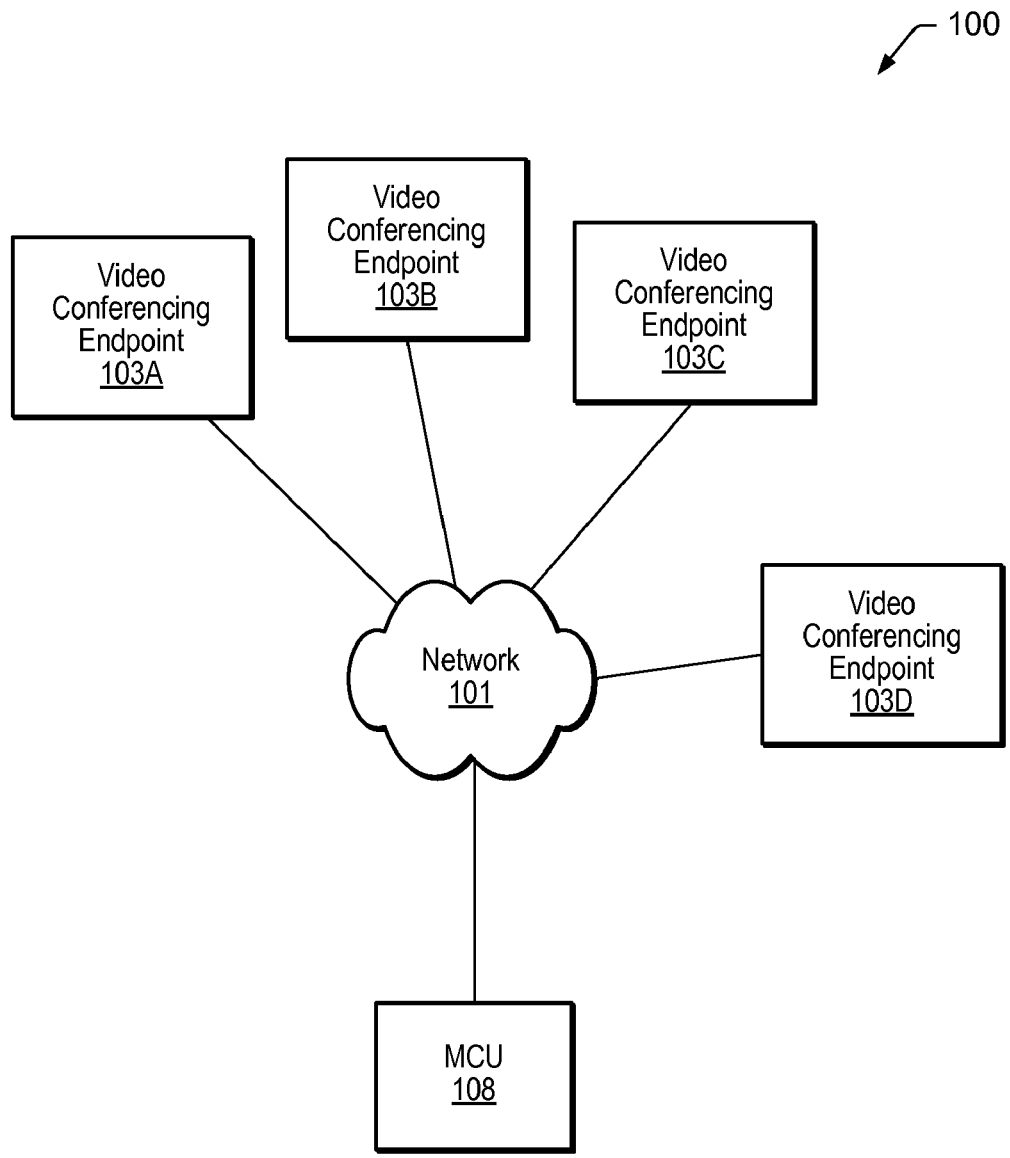
FIG. 1 illustrates a video conferencing endpoint network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Videoconferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, which was filed Jun. 19, 2008, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, which was filed Jun. 19, 2008, whose inventors are Keith C. King and Wayne E. Mock, is hereby incorporated by reference in its entirety as though fully and completely set forth herein.

U.S. patent application titled "Integrated Videoconferencing System", Ser. No. 11/405,686, which was filed Apr. 17, 2006, whose inventors are Michael L. Kenoyer, Patrick D. Vanderwilt, Craig B. Malloy, William V. Oxford, Wayne E. Mock, Jonathan I. Kaplan, and Jesse A. Fourt is hereby incorporated by reference in its entirety as though fully and completely set forth herein.

FIG. 1 illustrates an embodiment of a video conferencing system network 100. FIG. 1 illustrates an exemplary embodiment of a video conferencing system network 100 which may include a network 101, endpoints 103a-103d (e.g., video conferencing systems), and a Multipoint Control Unit (MCU) 108. Although not shown in FIG. 1, the video conferencing system network 100 may also include other devices, such as gateways, a service provider, conference units, and plain old telephone system (POTS) telephones, among others. Endpoints 103a-103d may be coupled to network 101 via gateways (not shown). Gateways may each include firewall, network address translation (NAT), packet filter, and/or proxy mechanisms, among others.

The endpoints 103a-103d may include video conferencing system endpoints (also referred to as "participant locations"). Each endpoint 103a-103d may include a camera, display device, microphone, speakers, and a codec or other type of video conferencing hardware. In some embodiments, endpoints 103a-103d may include video and voice communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103a-103d may include various ports for coupling to one or more devices (e.g., audio devices, video devices, etc.) and/or to one or more networks. Endpoints 103a-103d may each include and/or implement one or more real time protocols, e.g., session initiation protocol (SIP), H.261, H.263, H.264, H.323, among others. In an embodiment, endpoints 103a-103d may implement H.264 encoding for high definition (HD) video streams.

In some embodiments, the MCU 108 may function as a Multipoint Control Unit to receive video from two or more sources (e.g., endpoints 103a-d) and provide video (e.g., with composited video images) to two or more recipients (e.g., endpoints). "MCU" as used herein is intended to have the full breath of its ordinary meaning.

The network 101 may include a wide area network (WAN) such as the Internet. The network 101 may include a plurality of networks coupled together, e.g., one or more local area networks (LANs) coupled to the Internet. The network 101 may also include public switched telephone network (PSTN). The network 101 may also include an Integrated Services Digital Network (ISDN) that may include or implement H.320 capabilities. In various embodiments, video and audio conferencing may be implemented over various types of networked devices.

In some embodiments, endpoints 103a-103d and MCU 108 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103a-103d and MCU 108, etc.) that communicate through network 101.

In some embodiments, the video conferencing system network 100 (e.g., endpoints 103a-d and MCU 108) may be designed to operate with network infrastructures that support T1 capabilities or less, e.g., 1.5 mega-bits per second or less in one embodiment, and 2 mega-bits per second in other embodiments. In some embodiments, other capabilities may be supported (e.g., 6 mega-bits per second, over 10 mega-bits per second, etc). The video conferencing system may support HD capabilities. The term "high resolution" includes displays with resolution of 1280×720 pixels and higher. In one embodiment, high-definition resolution may include 1280×720 progressive scans at 60 frames per second, or 1920×1080 interlaced or 1920×1080 progressive. Thus, an embodiment of the present invention may include a video conferencing system with HD "e.g. similar to HDTV" display capabilities using network infrastructures with bandwidths T1 capability or less. The term "high-definition" is intended to have the full breath of its ordinary meaning and includes "high resolution".

Figure 2:
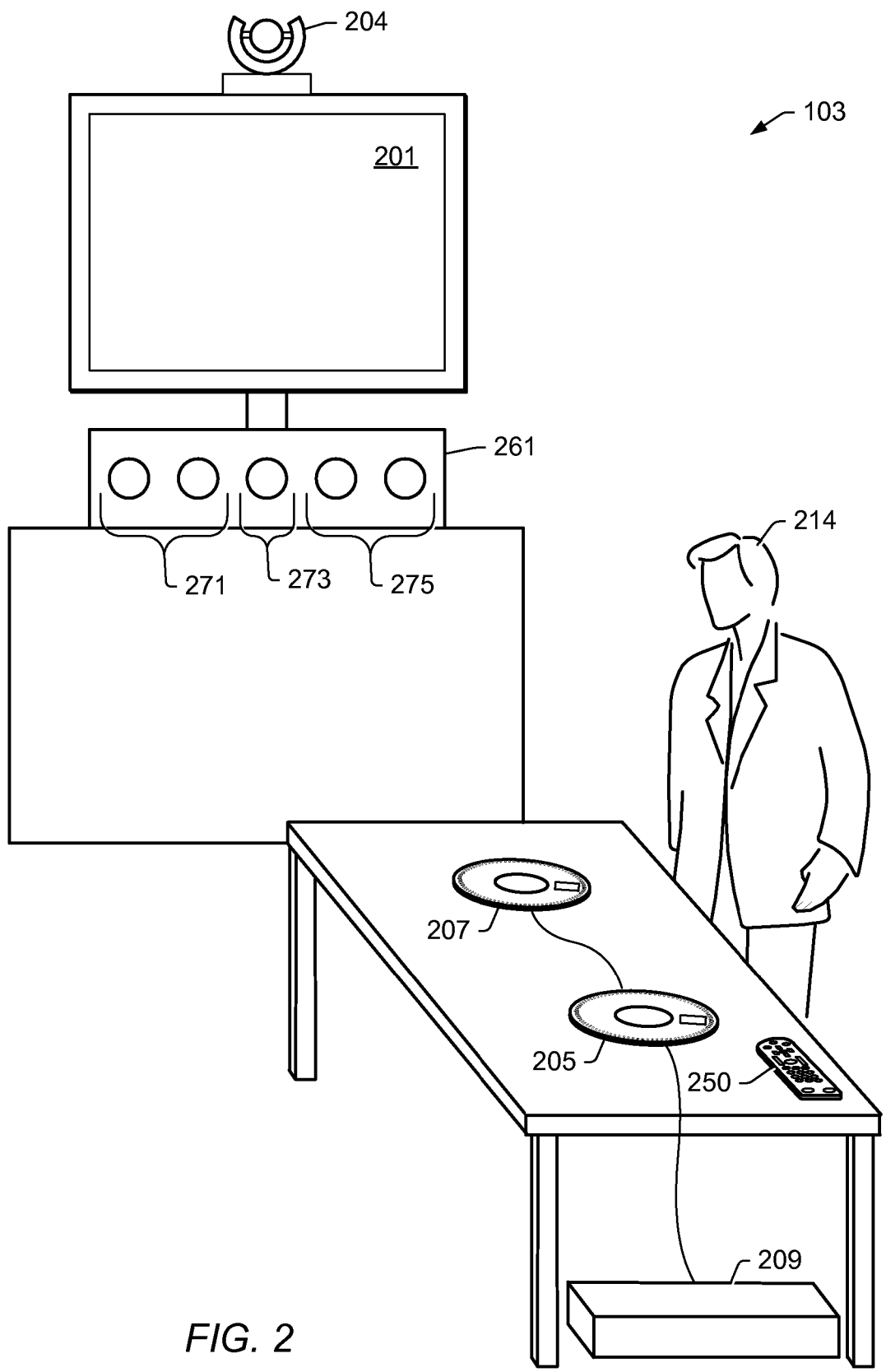
FIG. 2 illustrates a video conferencing endpoint, according to an embodiment.

FIG. 2 illustrates an exemplary embodiment of a video conferencing system endpoint 103 (e.g., 103a), also referred to as an endpoint or participant location. The endpoint 103 may have a system codec box 209 to manage both a speakerphone 205/207 and the video conferencing devices. The speakerphones 205/207 and other video conferencing system components may be coupled to the codec box 209 and may receive audio and/or video data from the system codec box 209.

In some embodiments, the endpoint 103 may include a camera 204 (e.g., an HD camera) for acquiring video images of the participant location (e.g., of participant 214). Other cameras are also contemplated. The endpoint 103 may also include a display 201 (e.g., an HDTV display). Video images acquired by the camera 204 may be displayed locally on the display 201 and may also be encoded and transmitted to other video conferencing endpoints 103 in the video conference, e.g., through the MCU 108.

The endpoint 103 may also include a sound system 261. The sound system 261 may include multiple speakers including left speakers 271, center speaker 273, and right speakers 275. Other numbers of speakers and other speaker configurations may also be used. The endpoint 103 may also use one or more speakerphones 205/207 which may be daisy chained together.

In some embodiments, the video conferencing endpoint components (e.g., the camera 204, display 201, sound system 261, and speakerphones 205/207) may be coupled to the system codec ("compressor/decompressor") box 209. The system codec box 209 may be placed on a desk or on a floor. Other placements are also contemplated. The system codec box 209 may receive audio and/or video data from a network (e.g., network 101). The system codec box 209 may send the audio to the speakerphone 205/207 and/or sound system 261 and the video to the display 201. The received video may be HD video that is displayed on the HD display. The system codec box 209 may also receive video data from the camera 204 and audio data from the speakerphones 205/207 and transmit the video and/or audio data over the network 101 to another conferencing system. The conferencing system may be controlled by a participant through the user input components (e.g., buttons) on the speakerphones 205/207 and/or remote control 250. Other system interfaces may also be used.

In various embodiments, the system codec box 209 may implement a real time transmission protocol. In some embodiments, a system codec box 209 may include any system and/or method for encoding and/or decoding (e.g., compressing and decompressing) data (e.g., audio and/or video data). In some embodiments, the system codec box 209 may not include one or more of the compressing/decompressing functions. In some embodiments, communication applications may use system codec box 209 to convert an analog signal to a digital signal for transmitting over various digital networks (e.g., network 101, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the endpoint 103 may capture a local image of the local participants and provide a video stream to the MCU 108. The MCU 108 may also receive video streams from other endpoints 103. The MCU 108 may create a composite video image of two or more of the received video streams and provide the composite video image to each of the endpoints 103. The composite video image, generated by the MCU 108, may have a certain layout. According to one embodiment, the MCU 108 may also generate coordinate information (or metadata) that describes the locations of the various images in the composite video image. The endpoint 103 may use the coordinate information to separate out the plurality of images from the composite video image, and then generate a new composite video image having a new layout, e.g., as specified by the user. The endpoint 103 may also use a virtual decoder technique in separating out the received composite video image, as described below. In some embodiments, separating may include copying, replacing, and/or modifying data from the video images to be used to create a new composite image.

Figure 3:
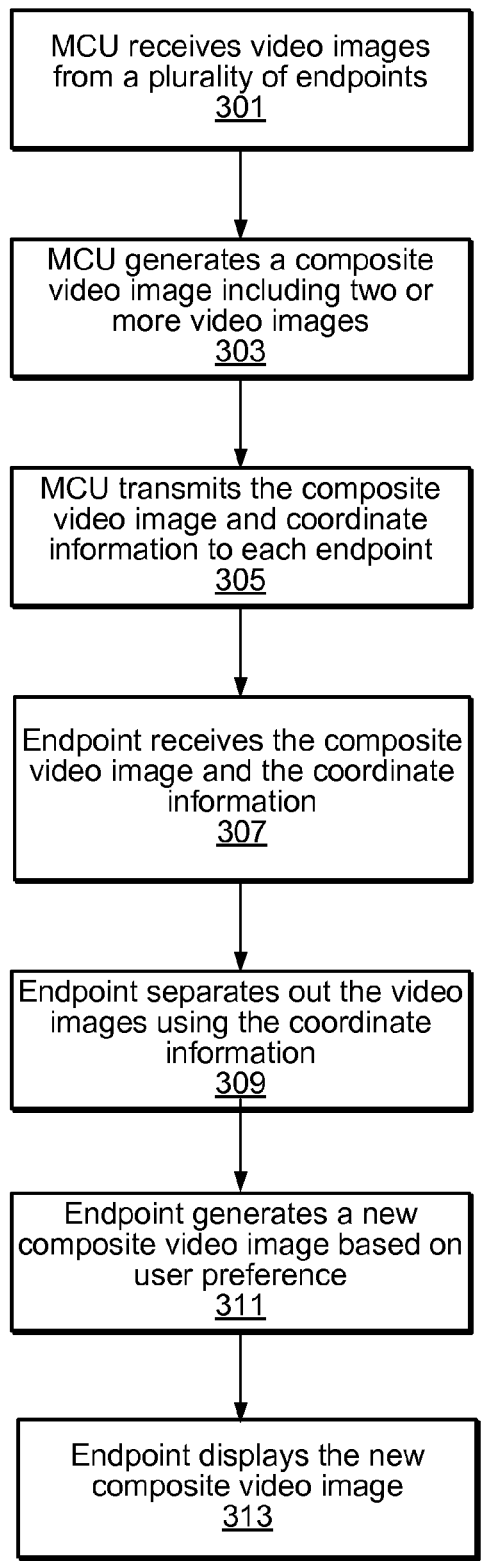
FIG. 3 illustrates a flowchart of a method for compositing a video image layout at an MCU and forming a new layout at the endpoint, according to an embodiment.
Figure 4A:
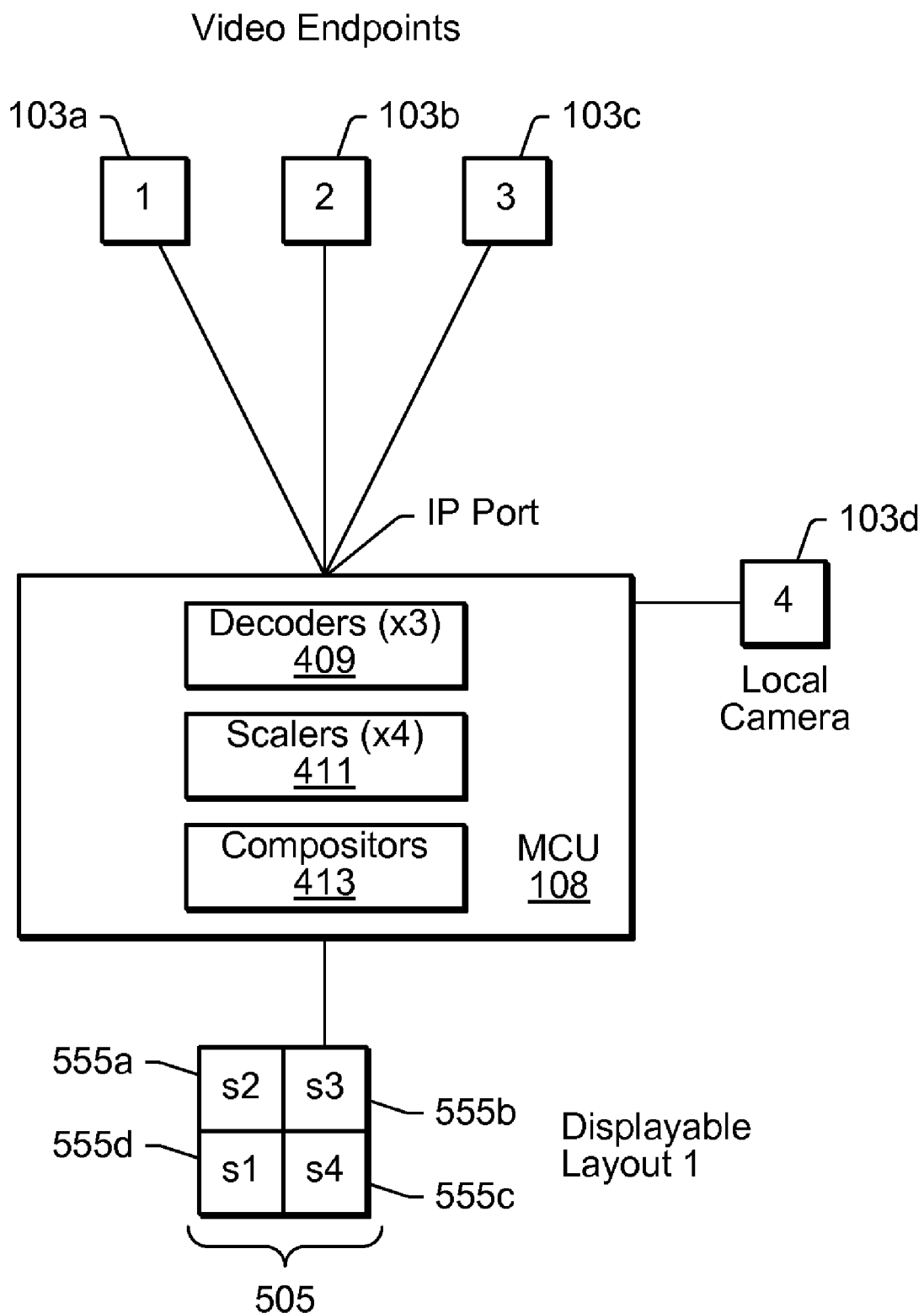
Figure 4B:
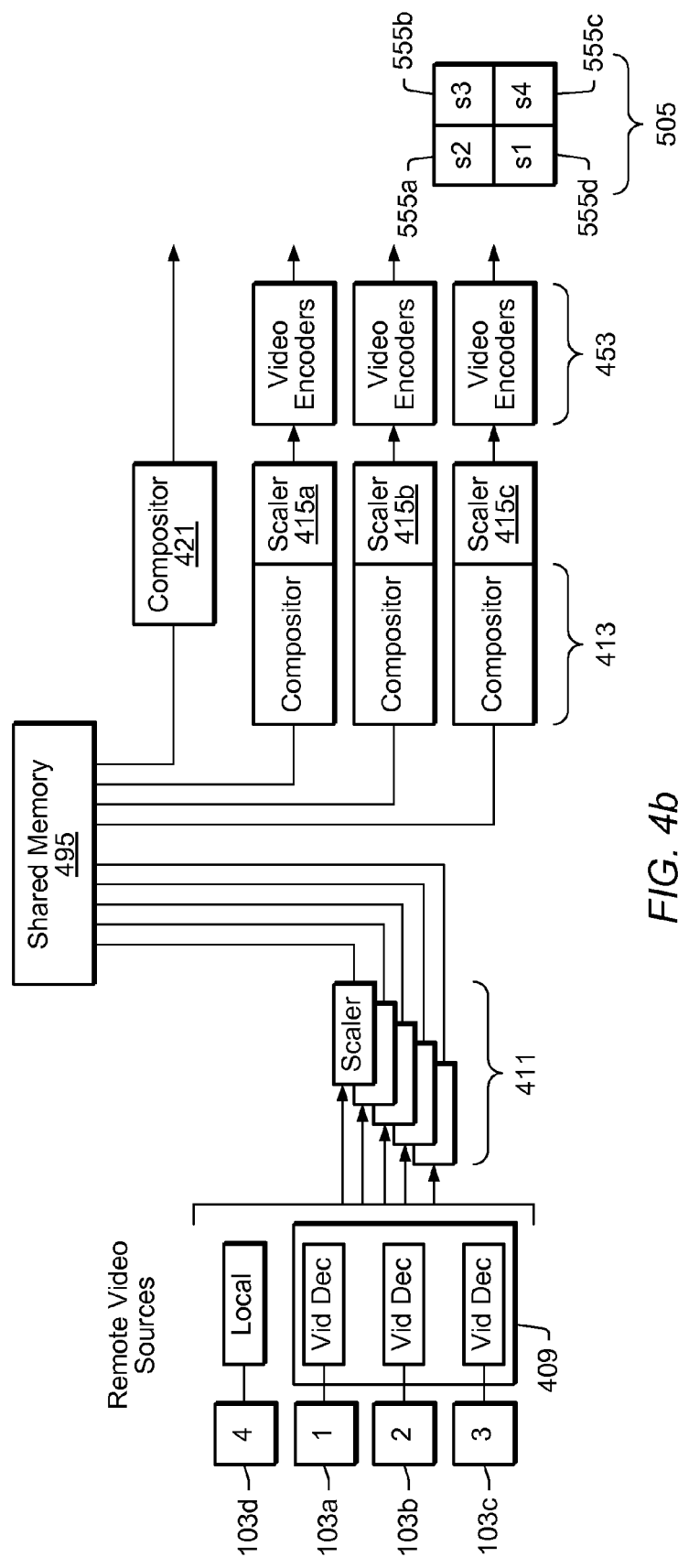
Figure 4D:
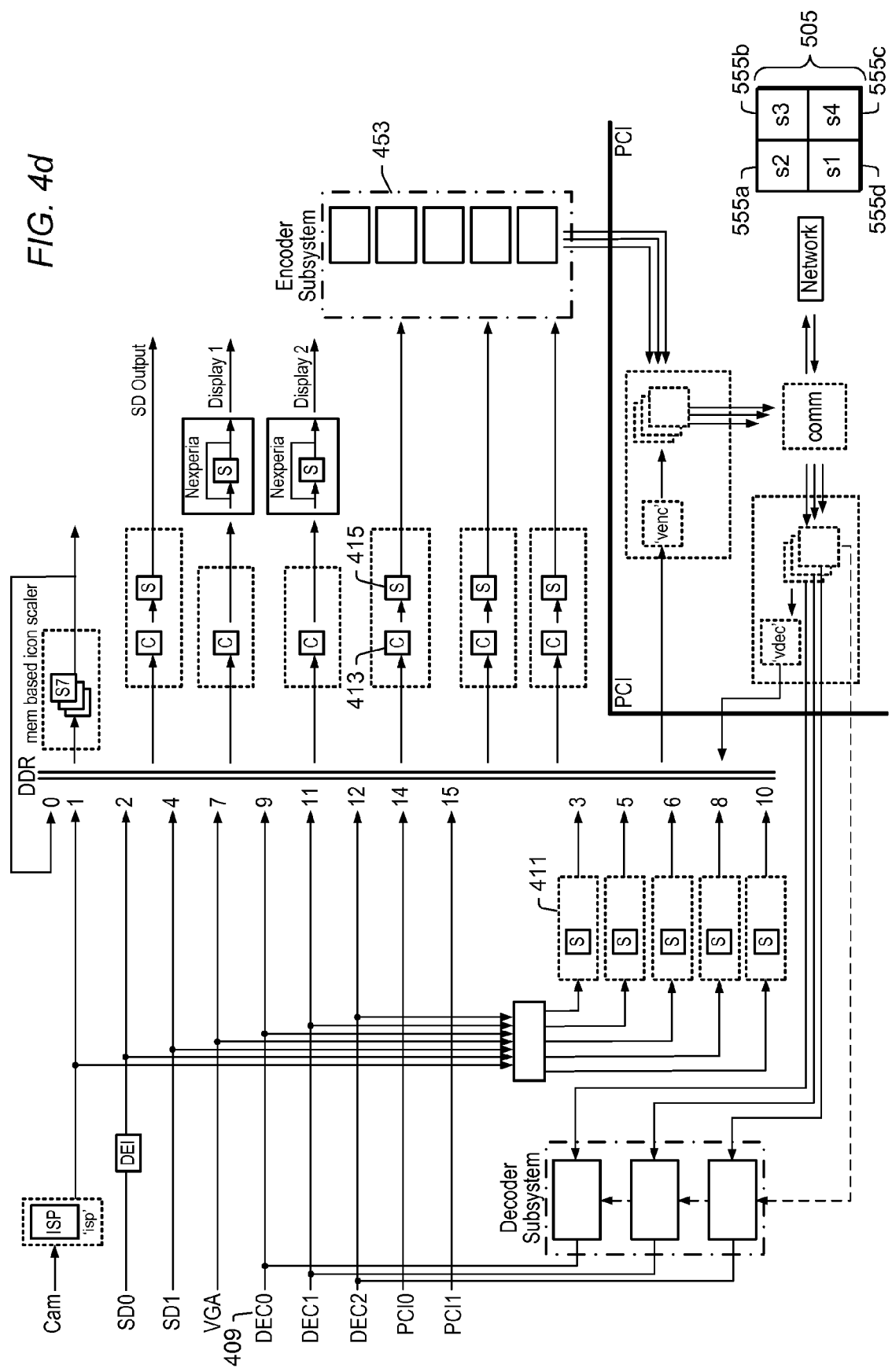

FIG. 3 illustrates a flowchart of a method for compositing a video image layout at an MCU 108 and forming a new layout at the endpoint 103, according to an embodiment. It should be noted that in various embodiments of the methods described below, one or more of the elements described may be performed concurrently, in a different order than shown, or may be omitted entirely. Other additional elements may also be performed as desired.

At 301, the MCU 108 may receive video images 555 from a plurality of endpoints 103. The endpoints 103 may be remote (e.g., endpoints 103a, 103b, and 103c) or local (e.g., local endpoint 103d including a local camera) and the video images 555 may include video (e.g., from camera 204) or presentations (e.g., from a Microsoft Powerpoint™ presentation). In some embodiments, the MCU 108 may use one or more decoders 409 (e.g., three decoders 409) to decode the received video images 555 from the respective endpoints 103. For example, video packets for the video frames with the respective received video images 555 may be assembled as they are received (e.g., over an Internet Protocol (IP) port) into the MCU 108. FIGS. 4a-d illustrate embodiments of MCUs 108.

Figure 10:
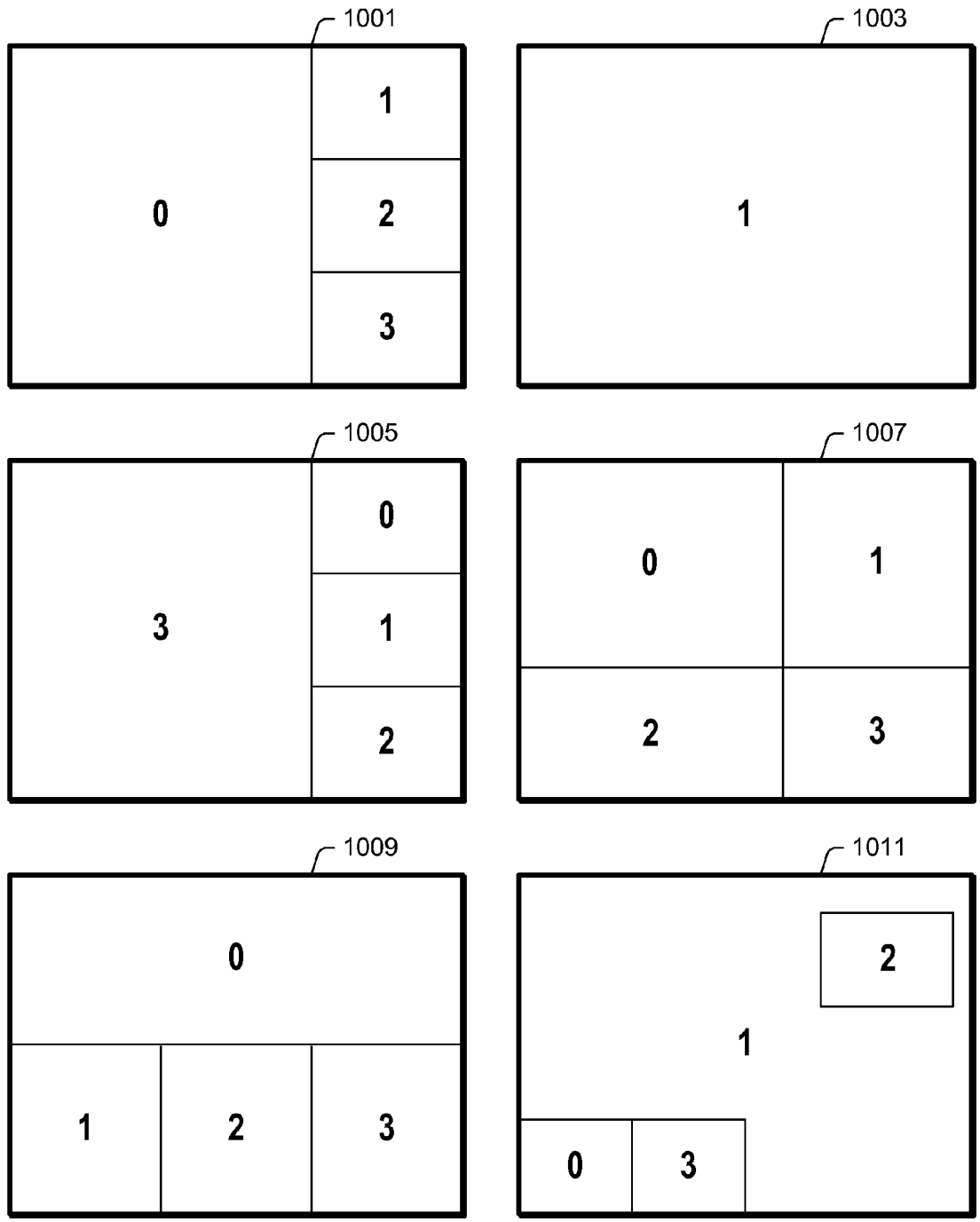
FIG. 10 illustrates various video image layouts, according to various embodiments.
Figure 11:
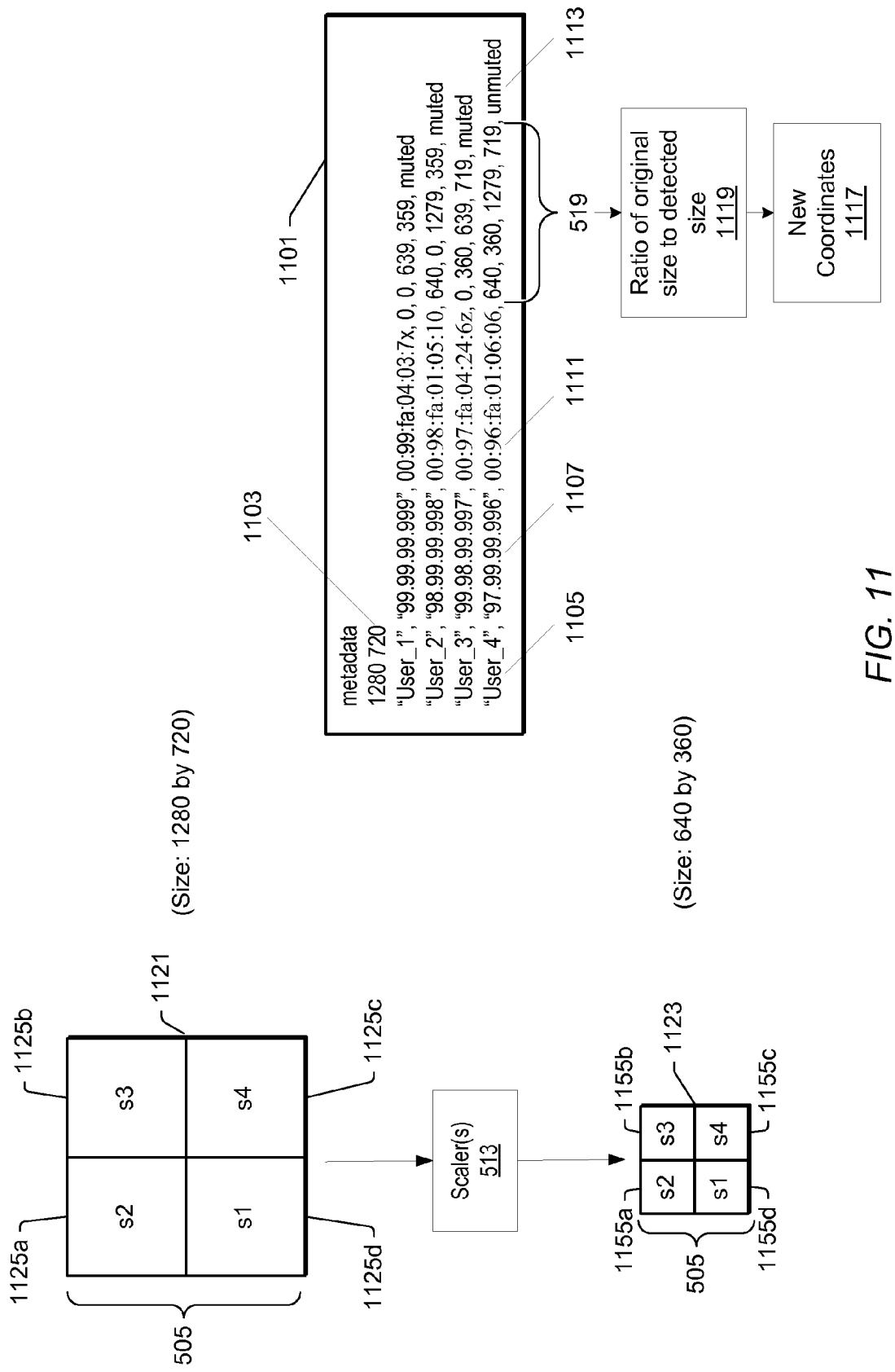
FIG. 11 illustrates a scaled composite video image, according to an embodiment.

In some embodiments, the MCU 108 may also receive video image layout preferences from one or more of the endpoints 103. For example, endpoint 103 may receive a video image layout preference from one or more video conferencing participants 214 (e.g., through a menu on an onscreen interface) and may transmit that preference to the MCU 108. In some embodiments, a button on remote 250 may allow a video conference participant 214 to cycle through two or more available layout preferences. The video image layout preference may include a layout type (e.g., layout type 1001, 1003, 1005, 1007, 1009, or 1011 as seen in FIG. 10). Other layout types are also possible. The video image layout preference may specify which endpoint's video image to place in each of the available layout positions (e.g., which endpoint video image should be placed in the main layout position and which endpoint video images should be placed in the other layout positions). In some embodiments, the MCU 108 may not receive a video image layout preference from one or more endpoints 103. In some embodiments, the video image layout preference may be generated at the MCU 108. For example, software on the MCU 108 may determine which endpoint 103 has the current speaker/presenter and may place the corresponding video image in a main video image window of the layout (e.g., with other endpoint video images arranged around the main video image). Other layout selection methods are also contemplated.

In some embodiments, the MCU 108 may also be operable to receive other information from the endpoints 103. For example, an endpoint 103 may send data to the MCU 108 to move a far end camera (e.g., on another endpoint). The MCU 108 may subsequently transmit this information to the respective endpoint to move the far end camera.

Figure 5A:
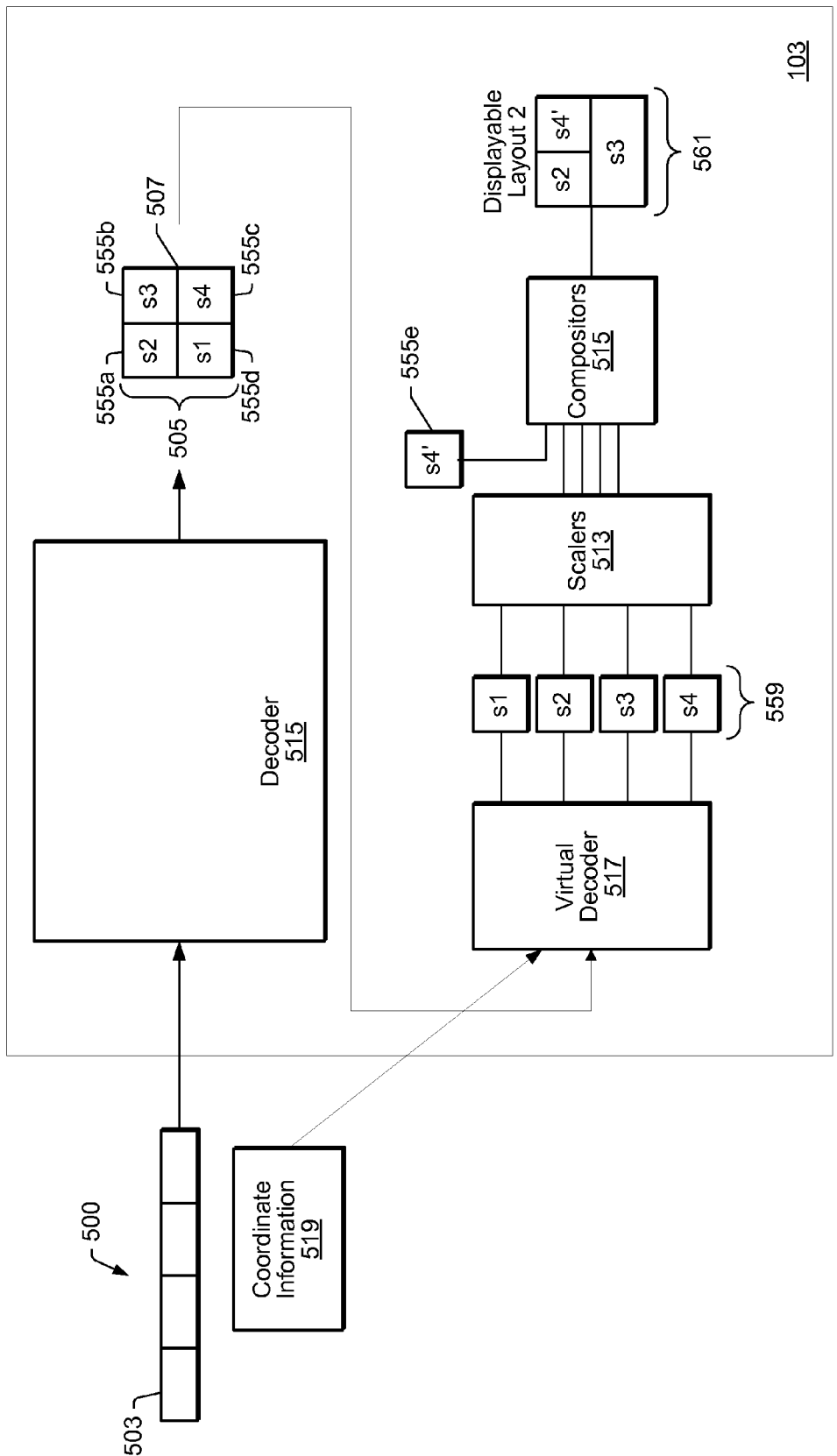
FIG. 5a illustrates an overall view of the re-compositing process including a virtual decoder, according to an embodiment.
Figure 5B:
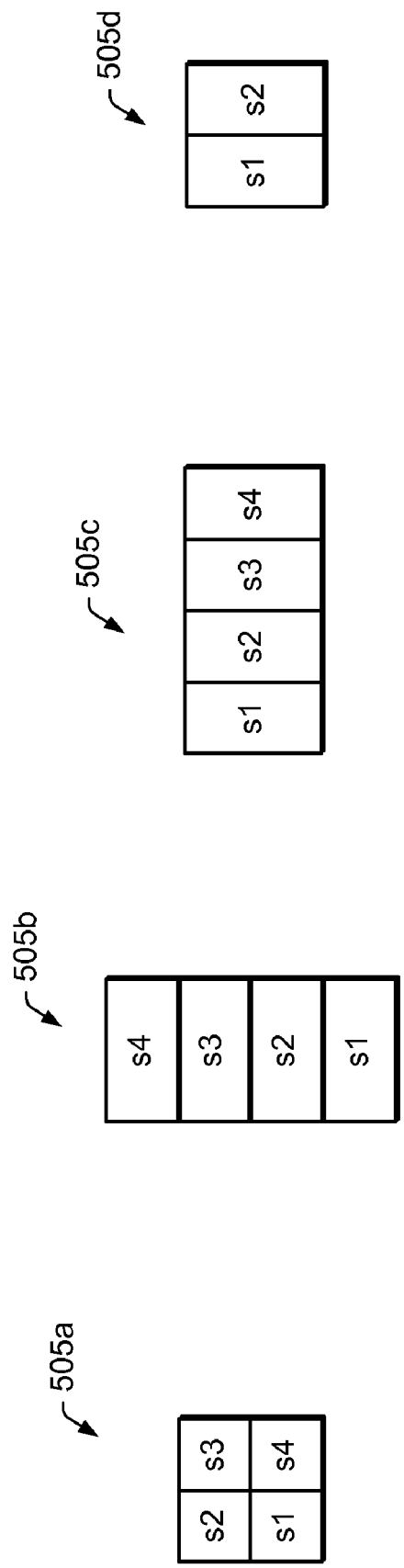
FIG. 5b illustrates several embodiments of composite video images.

At 303, the MCU 108 may generate a composite video image including two or more video images 555 (for example, from the endpoints 103 (such as video images 555*a*, 555*b*, 555*c*, and 555*d*)). In some embodiments, the MCU 108 may have one or more scalers 411 (e.g., four scalers) and compositors 413 to scale received video images 555 and composite two or more of the video images 555 from the endpoints 103 into, for example, a composite video image 505 (e.g. which may include one or more video images 555 in, for example, a continuous presence). Example composite video images 505 are illustrated in FIG. 5*b* (e.g., composite video images 505*a*, 505*b*, 505*c*, and 505*d*).

In some embodiments, scalers 411 may be coupled to video decoders 409 (e.g., through crosspoint switch 499 shown in FIG. 4*c*) that decode video images 555 from the various video sources (e.g., endpoints 103). The scalers 411 may scale the video images 555 after the video images 555 are decoded. In some embodiments, one or more of the video images 555 may not be scaled. For example, the two or more video images 555 may be rearranged into a composite video image 505 without being scaled. In some embodiments, the scalers 411 may be 7-15 tap scalers. The scalers 411 may use linear combinations (e.g., with similar or different coefficients) of a plurality of pixels in a video image 555 for each pixel scaled. Other scalers 411 are also contemplated. In some embodiments, the video images 555 may be stored in shared memory 495 after being scaled. In some embodiments, the scaler 411, compositor 421, compositor 413, and scalers 415 may be implemented in one or more FPGAs. Other processor distributions are also contemplated. For example, FPGAs and/or other processors may be used for one or more other elements shown on FIG. 4*b*.

In some embodiments, compositors 413 may access the video images 555 (e.g., from shared memory 495) to form composited video images. In some embodiments, the MCU 108 may composite the video images 555 into the respective video image layouts requested by the endpoints 103. For example, the MCU 108 may composite two or more of the received video images 555 into a continuous presence layout (e.g., see layout types 1001, 1003, 1005, 1007, 1009, or 1011 in FIG. 10). In some embodiments, the MCU 108 may form multiple composite video images according to respective received video image layout preferences.

While four video images 555 are shown with respect to video frame 507, it is noted that video frame 507 may include a composite video image 505 with other combinations and layouts of two or more video images 555. For example, as seen in FIG. 5*b*, composite video image 505*b* may include four video images 555 stacked on top of each other. In some embodiments, each video image of the stacked video images may be 1280 by 720 pixels (e.g., for a total size of 1280 by 2880) (other dimensions and number of video images are also contemplated). In some embodiments, composite video image 505*c* may include four images side by side. As another example, the composite video image 505*d* may include two video images (e.g., each 640 by 360 pixels) arranged side by side in a 1280 by 360 pixel video frame. The video frame 507 may then be separated into two 640 by 360 pixel video images. Other combinations and layouts are also contemplated. In some embodiments, the number of video images 555 composited in the composite video image 505 may depend on the number of participating endpoints 103 in the video conference. For example, each participating endpoint may have a corresponding video image (which may be, for example, 1280 by 720) in the composite video image 505.

In some embodiments, the output of the compositors 413 may again be scaled (e.g., by scalers 415 (such as scalers 415*a*, 415*b*, and 415*c*)) prior to being encoded by video encoders 453. The video data received by scalers 415 may be scaled according to the resolution requirements of a respective endpoint 103. In some embodiments, the output of a compositor 413 may not be scaled prior to being encoded and transmitted to the endpoints 103. In some embodiments, the composite video image 505 may be transmitted as a video frame 507 through video stream 500 (see FIG. 5*a*) to the respective endpoints 103.

In some embodiments, the MCU 108 may determine the coordinates of the video images 555 in the composite video image 505. For example, the coordinate information 519 may indicate the start/stop locations of one or more of the video images 555 in the video frame 507. This coordinate information 519 may be stored on the MCU 108.

At 305, the MCU 108 may transmit the composite video image 505 (which includes one or more video images 555) and the coordinate information 519 to each endpoint 103. For example, the MCU 108 may transmit a respective composite video image 505 (with the respective coordinate information 519 for the respective composite video image 505) to a respective endpoint 103 (e.g., according to the video image layout preference received from the respective endpoint 103). The MCU 108 may also transmit the coordinate information 519 to the endpoints 103. The coordinate information 519 sent to a respective endpoint 103 may be specific to the respective composite video image 505 sent to that endpoint 103. The coordinate information 519 may identify the locations of specific video images 555 in the received composite video image 505. In some embodiments, the coordinate information 519 may be transmitted as metadata 901 with the composite video image 505. The metadata 901 may include coordinate information 519 for a video frame 507 with the start (and/or stop) information for a video image 555 (e.g., video image boundaries and/or pixel start/stop points) corresponding to an endpoint 103. The metadata 901 may also include attributes of each of the plurality of endpoints 103 including identifying information respective to the corresponding endpoints 103 for each video image 555. Other information in the metadata 901 is also contemplated.

At 307, the endpoint 103 may receive the composite video image 505 and the coordinate information 519 (e.g., in metadata 901). For example, video frame 507 including two or more video images 555 may be received. The video frame 507 may be received as a series of video packets 503 in video stream 500 at decoder 515. The decoder 515 may assemble the video packets 503 into their respective video frames 507 for further processing in virtual decoder 517.

At 309, the endpoint 103 may separate the video images 555 using the coordinate information 519. Virtual decoders 517 at one or more of the endpoints 103 may separate the composite video image 505 (e.g., a continuous presence layout) into two or more separate video images 559. In some embodiments, the coordinate information 519 may be used to find video image boundaries of the video images 555 within the video frame 507. In some embodiments, the coordinate information 519 may be used to determine where the respective video images 555 start and stop in the video frame 507. These start/stop locations may be used by the virtual decoder 517 to separate the one or more video images 555 from the video frame 507. For example, the separate video images may be defined and/or scaled out of the composite video image 505. For example, the coordinate information 519 may be used by the virtual decoder 517 to crop the respective video images 555 (e.g., video images 555a and 555b) in the video frame 507. In some embodiments, separating the video images 555 may include, for example, storing the separated video images 559 in separate locations of a memory. In some embodiments, separating the video images 555 may include storing start and/or stop locations of the separated video images 559 in a memory. Other means for separating the video images 555 are also contemplated. For example, separating may include copying, replacing, and/or modifying data from the video images 555 of the composite video image 505 to be used to create a new composite image layout (see 311 below).

Figure 9:
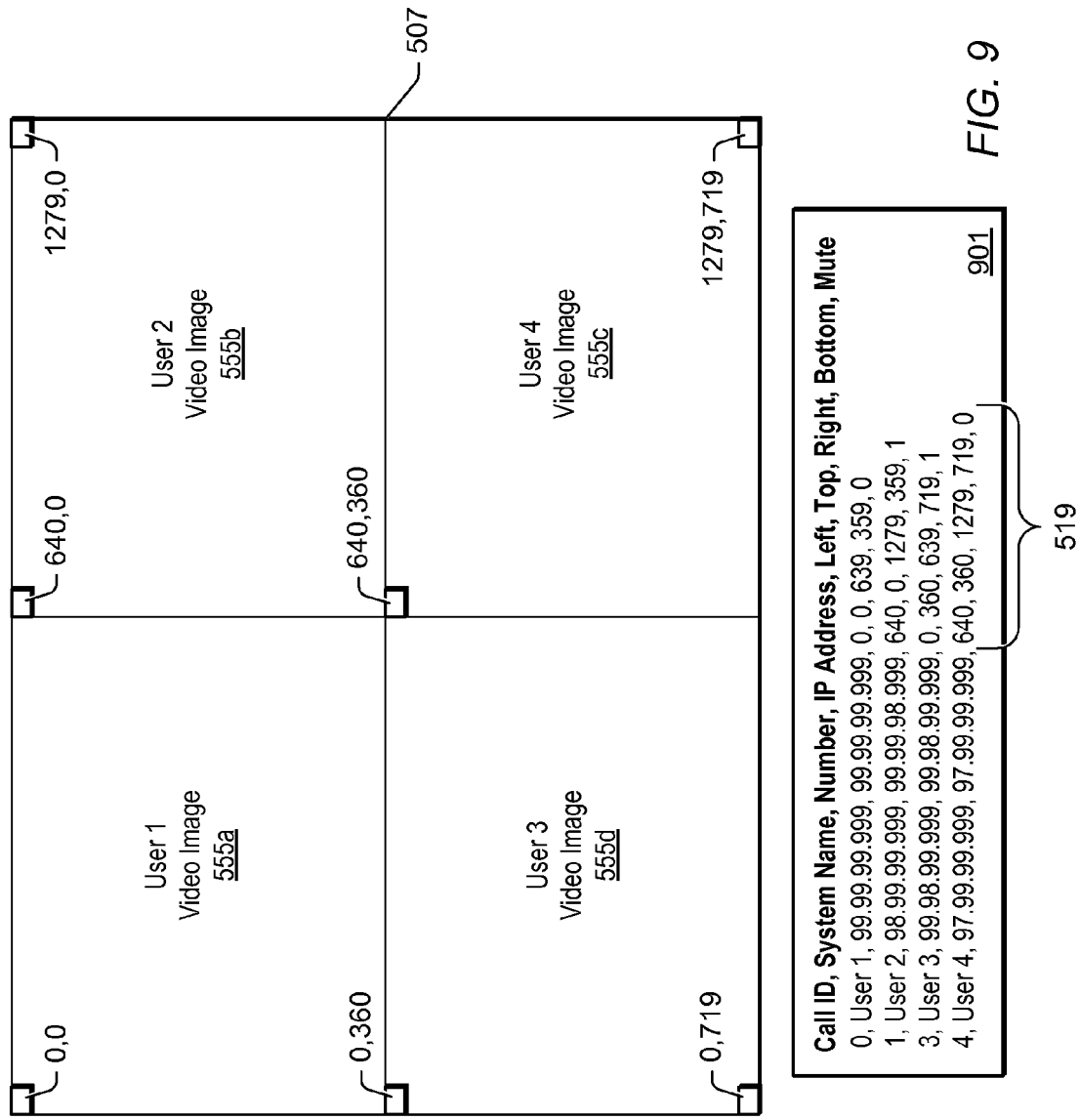
FIG. 9 illustrates a coordinate system for a video frame, according to an embodiment.

FIG. 9 illustrates an example of a use of coordinate information 519 to locate the boundaries of four video images (e.g., video images 555a-d) in order to separate the video images 555. For example, the User 1 video image 555a may have a left boundary at 0, a top boundary at 0, a right boundary at 639 (e.g., 639 pixels to the right of the left edge of the video frame 507), and a bottom boundary at 359. Similarly, the user 2 video image 555b may have a left boundary at 640, a top boundary at 0, a right boundary at 1279, and a bottom boundary at 359. Coordinate information 519 (e.g., boundary information) for other video images (e.g., video images 555c and 555d) may also be provided e.g., in metadata 901.

In some embodiments, coordinate information for a respective video image may be placed in a row of information for the respective video image. For example, row one of data in metadata 901 may include a call identifier, system name, number, Internet Protocol (IP) address, and left, top, right, bottom coordinates (e.g., 0, 0, 639, and 359) for a respective video image (other information may also be included).

Figure 6:
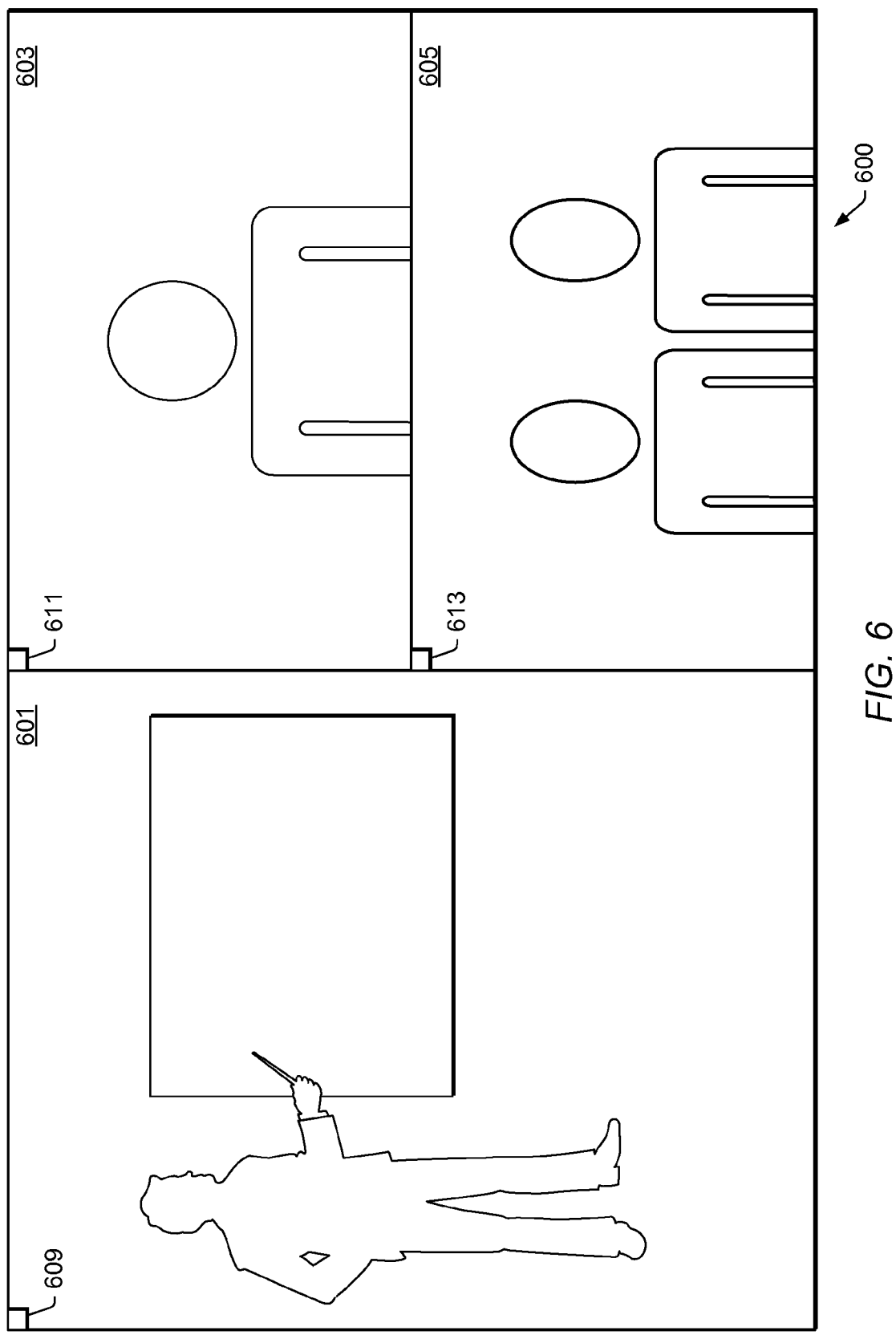
FIG. 6 illustrates a video image layout, according to an embodiment.
Figure 7:
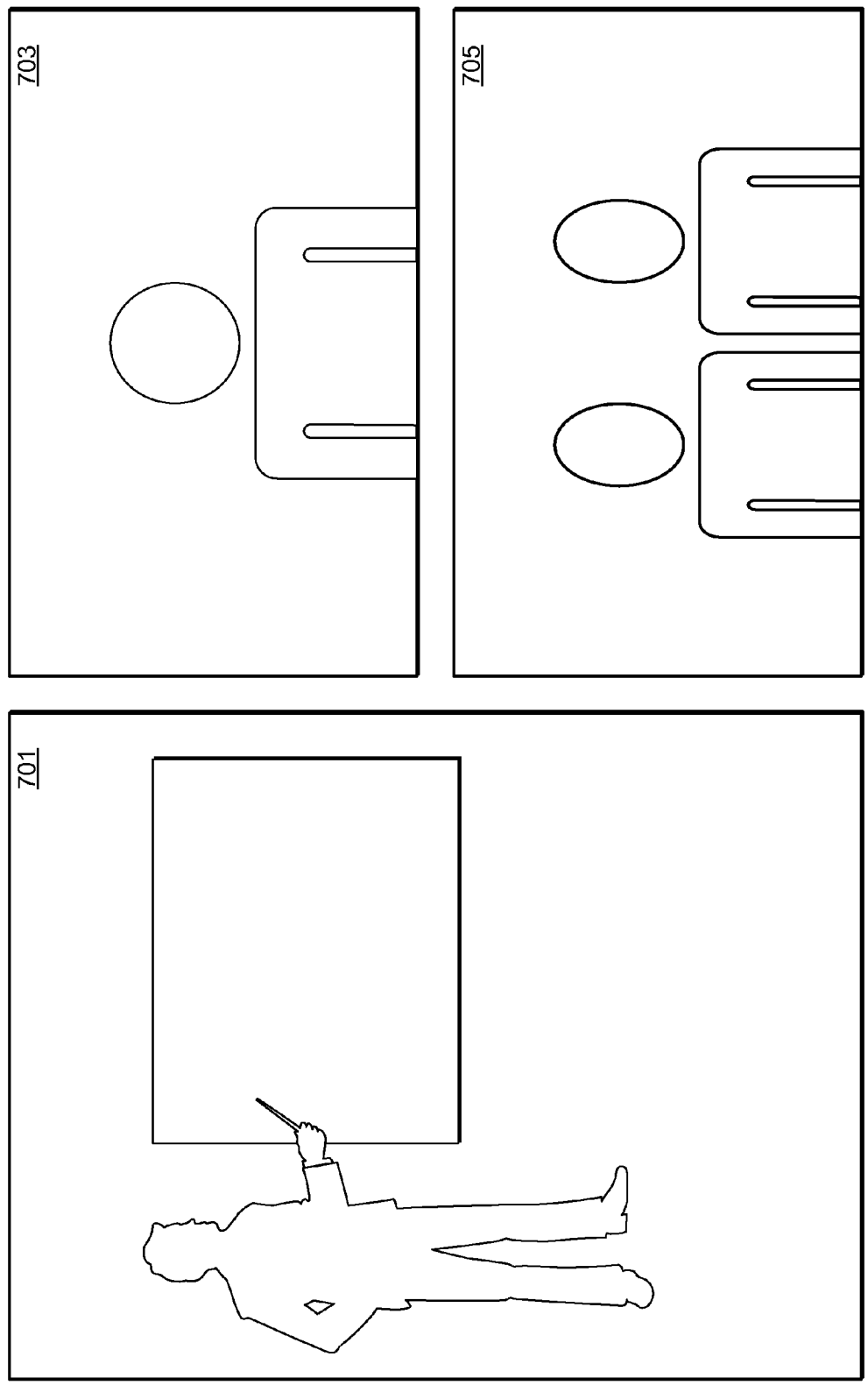
FIG. 7 illustrates separated video images from the video image layout, according to an embodiment.

FIG. 6 shows an example of a composite video image 600 with three video images 601, 603, and 605 originating from different endpoints 103. The composite video image 600 may include a main video image 601 of the endpoint with the current speaker/presenter and two or more side video images (e.g., side video images 603 and 605) of other endpoints participating in the video conference. Coordinate information 519 for coordinates 609, 611, and 613 may be sent with the video frame 507 and used by the virtual decoder 517 to separate the video images into separated video images 701, 703, and 705 (as seen in FIG. 7).

In some embodiments, the virtual decoder 517 may be implemented as a software abstraction on hardware such as an FPGA or other processor. In some embodiments, one or more virtual decoders 517 may be implemented on a single ASIC (Application Specific Integrated Chip). Other virtual decoder configurations are also contemplated. In some embodiments, a separate processor may implement the virtual decoder 517 by issuing commands to reprogram at least one FPGA to implement the virtual decoder 517. Other configurations are also contemplated.

At 311, the endpoint 103 may generate a new composite video image based, for example, on user preference. In some embodiments, one or more of the separated video images 559 may be provided to one or more scalers 513. The video images (including scaled video images, if any) may then be provided to one or more compositors 515. One or more compositors 515 may composite the video images into a new video image layout 561 (e.g., requested by a local participant 214 through their local endpoint 103d). In some embodiments, a local participant may cycle through the layout offerings from the endpoint 103 (e.g., by clicking an icon to cycle to the next available layout). In some embodiments, the scalers 513 and compositors 515 may be implemented in hardware or software. In some embodiments, icon scalers may be used (e.g., if all of the endpoint's other scalers are being used).

As an example, if the main video image 701 and each of the two side video images 703 and 705 are to be placed in a video image layout with equal sized video images, the main video image 701 may be scaled down and the two side video images 703 and 705 may be scaled up (or not scaled at all). Other scaling combinations are also contemplated. In some embodiments, the separated video images may not be scaled (e.g., the separated video images may be only rearranged).

In some embodiments, the endpoint 103 may form a new composite video image that includes its current local video image 555e (see FIG. 5a) as one of the video images. In some embodiments, the layout of the received video image layout and the new video image layout may be the same. In some embodiments, the current local video image 555e may be more current than the local video image 555c originally sent to the MCU 108 and received in the composite video image 505.

Figure 8:
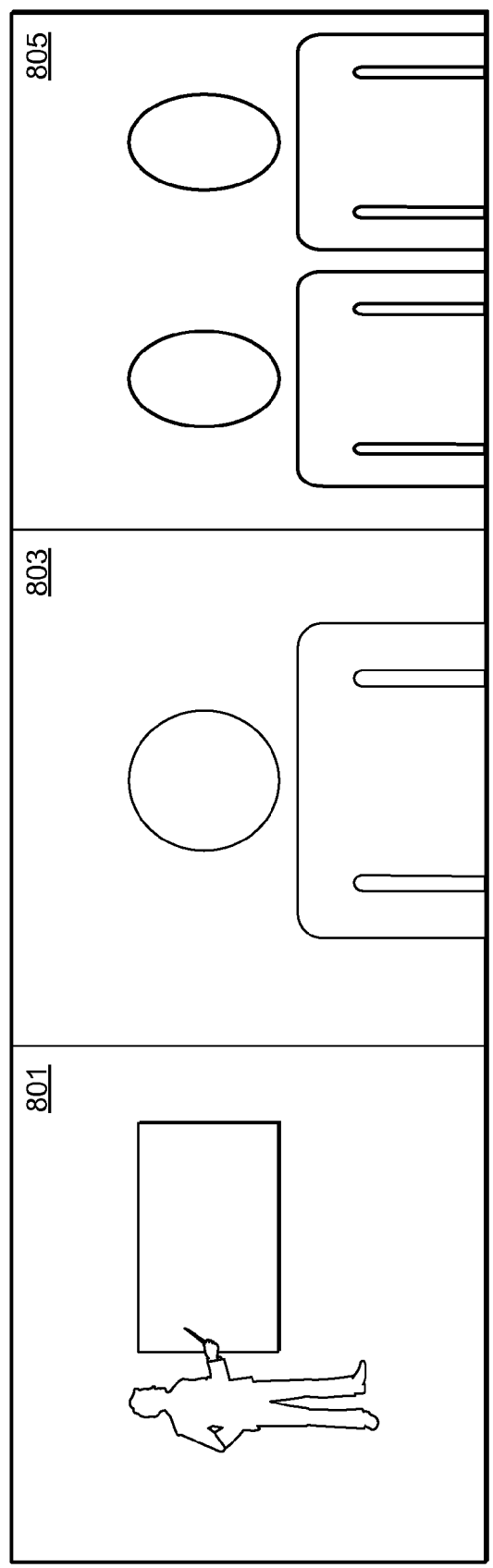
FIG. 8 illustrates a composite video image with a new video layout using the separated video images, according to an embodiment.

At 313, the endpoint 103 may display the new composite video image. FIG. 8 illustrates an example of a new video image layout with three similar sized video images 801, 803, and 805 on display. FIG. 10 illustrates other possible video image layouts, according to various embodiments. Other video image layouts are also contemplated. In some embodiments, the metadata 901 may be displayed (e.g., with each respective video image in the video image layout).

In some embodiments, the MCU 108 may arrange the incoming video images 1125a-d into a composite video image 1121 with the requested video image layout and define the respective coordinate information 519 for one or more of the video images in the composite video image 1121 including the size 1103 of the original composite video image 1121. In some embodiments, the MCU 108 may need to subsequently scale the composite video image 1121 (e.g., scale down the composite video image 1121 to be sent over a reduced bandwidth network connection) to be sent to one or more endpoints. In some embodiments, the composite video image 1121 may be scaled into scaled composite video image 1123 in scaler 513. The coordinate information 519 may be included in metadata 1101 passed with the video frame 507 that includes the scaled composite video image 1123. In some embodiments, the coordinate information 519 may be reformatted (e.g., at the MCU 108 or at the receiving endpoint) to reflect the new coordinates of one or more of the resized video images in the scaled composite video image 1123. For example, when the endpoint receives the scaled composite video image 1123, the endpoint may detect the actual size of the scaled composite video image 1123 and may determine the new coordinates 1117 of one or more of the video images in the scaled composite video image 1123 using, for example, a ratio 1119 of the size 1103 of the original composite video image 1123 to the size of the scaled composite video image 1123 detected by the endpoint. These new coordinates 1117 may then be used to separate one or more of the resized images 1155*a-d* in the scaled composite video image 1123 to use in compositing a new composite video image.

Figure 12:
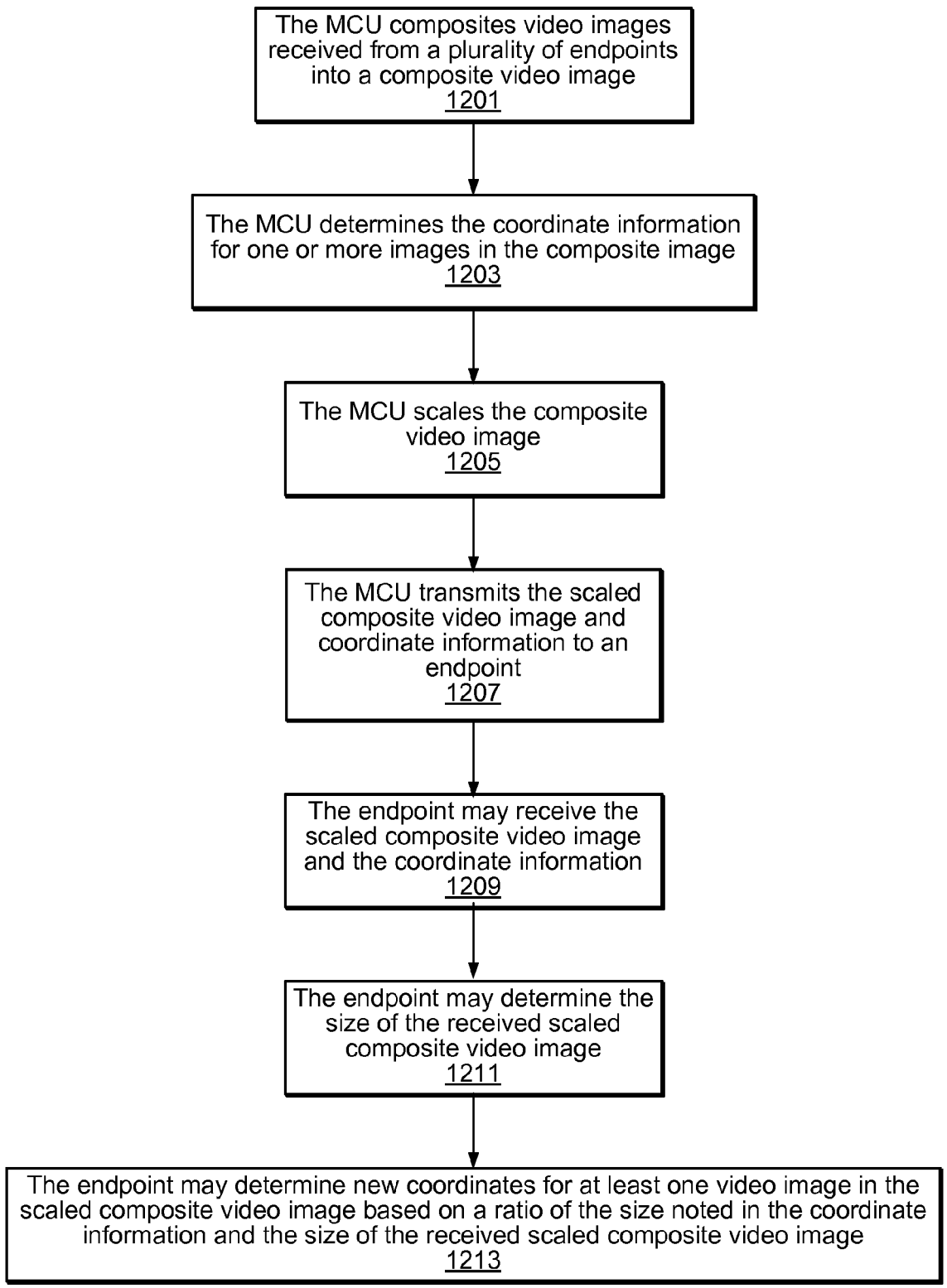
FIG. 12 illustrates a flowchart of a method for virtual multiway scaler compensation, according to an embodiment.

FIG. 12 illustrates a flowchart of an embodiment of a method for virtual multiway scaler compensation. It should be noted that in various embodiments of the methods described below, one or more of the elements described may be performed concurrently, in a different order than shown, or may be omitted entirely. Other additional elements may also be performed as desired.

At 1201, the MCU 108 may composite video images (e.g., video images 1125*a-d*) received from a plurality of endpoints into a composite video image 1121. The composite video image 1121 may be of a first size (e.g., 1280 by 720).

At 1203, the MCU 108 may determine the coordinate information 519 for one or more of the video images 1125*a-d* in the composite video image 1121. In some embodiments, the coordinate information 519 may include the size 1103 of the original composite video image 1121. The size 1103 may include the height and width of the original composite video image 1121. Other size designations are also contemplated. In some embodiments, the size 1103 may be automatically included with the coordinate information 519 (e.g., included with the metadata 1101). In some embodiments, the size 1103 may only be included with the coordinate information 519 if the composite video image 1121 is subsequently scaled.

At 1205, the MCU 108 may scale the composite video image 1121 (e.g., in scaler 513). The composite video image 1121 may be scaled up or down (e.g., by adjusting the resolution of the composite video image 1121) into a scaled composite video image 1123. For example, the scaled composite video image 1123 may have a size of 640 by 360. Other sizes are also contemplated. In some embodiments, the composite video image 1121 may be scaled down to be sent over a reduced bandwidth network connection and/or a network connection that is experiencing frequent packet loss. Other reasons for scaling the composite video image are also contemplated (e.g., the composite video image may exceed a maximum accepted resolution for the receiving endpoint or the receiving endpoint may request a lower resolution).

At 1207, the MCU 108 may transmit the scaled composite video image 1123 and coordinate information 519 (e.g., transmit the metadata 1101) to one or more endpoints in the video conference. In some embodiments, all of the endpoints in the video conference may receive the scaled composite video image 1123. In some embodiments, a subset of the endpoints in the video conference may receive the scaled composite video image 1123. In some embodiments, the coordinate information 519 may be sent as metadata 1101 along with the scaled composite video image 1123. The metadata 1101 may include the size 1103 of the original composite video image 1121 (which may include original width (e.g., 1280) and original height (e.g., 720)), endpoint name 1105, endpoint number 1107 (e.g., network address), endpoint unique identification 1111, coordinate information 519, and audio status 1113 (e.g., muted/unmated). In some embodiments, the Media Access Control (MAC) address of one or more respective endpoints may be included in the metadata 1101. Other metadata combinations are also contemplated.

At 1209, the endpoint may receive the scaled composite video image 1123 (e.g., including video images 1155*a-d*) and the coordinate information 519. The coordinate information 519 may include the size 1103 of the original composite video image 1121.

At 1211, the endpoint may determine the actual size of the received scaled composite video image 1123. The endpoint may determine that the size of the received scaled composite video image does not match the size 1103 noted in the coordinate information 519 sent with the scaled composite video image 1123. In some embodiments, the size of the original composite video image may not be included with the coordinate information 519, however the size (or approximate size) may be determined using the coordinate information 519 provided for the video images (e.g. by noting or approximating the boundaries of one or more of the video images). In some embodiments, other size information may be used. For example, a configuration indicator (e.g., indicating 2 images side by side, 2 images stacked, 2 images by 2 images, etc.) may be sent in the coordinate information 519 along with a relative size of each original image (e.g., 640 by 360). Other size and configuration information is also contemplated (e.g., to indicate relative locations and sizes of the original images).

At 1213, the endpoint may determine new coordinates 1117 respective to one or more of the video images 1155*a-d* in the scaled composite video image 1123 based on a ratio 1119 of the size 1103 (e.g., including original width size (1280) and original vertical (height) size (720)) and noted in the coordinate information 519 and the size of the received scaled composite video image 1123 (e.g., as detected by the endpoint). For example, if the size of the scaled composite video image 1123 is half the size of the original composite video image 1121, the new left starting point coordinate of each image in the scaled composite video image 1123 may be half the value of the left starting point coordinate noted in the coordinate information 519 for the original composite video image 1121 (e.g., 640 may become 320). For example (for User 4 frame, left coordinate): Original Width Size/Detected Width Size=Original width coordinate/Actual width coordinate(X); 1280/640=640/X; X=320. As another example (for User 4 frame, top coordinate), Original Vertical Size/Detected Vertical Size=Original vertical coordinate/Actual vertical coordinate(Y); 720/360=360/Y; Y=180.

The endpoint may use the new coordinates 1117 to separate one or more of the video images 1155*a-d* and/or recomposite a new composite video image with a new video image layout including at least one of the video images 1155*a-d*. For example, the local video at the endpoint may be composited into a new video image layout for display at the endpoint. In some embodiments, the endpoint may adjust its scaling rectangle to match the new coordinates 1117 (e.g., in order to pull one or more respective video images out of the scaled composite video image 1123). In some embodiments, the new video image layout may have the same layout as the original composite video image 1121, but, for example, with one or more different video images composited into the new composite video image. In some embodiments, only the one or more video images to be replaced may be separated out of the composite video image 1123 using the coordinate information 519. In some embodiments, all of the video images in the composite video image 1123 may be separated out.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RDRAM), etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A video conferencing system, comprising:
   a multipoint control unit (MCU); and
   a plurality of video conferencing endpoints, wherein each of the plurality of video conferencing endpoints is coupled to the MCU;
   wherein each of the plurality of video conferencing endpoints is operable to transmit a video image to the MCU;
   wherein the MCU is operable to receive each of the video images from the plurality of video conferencing endpoints and generate a composite video image;
   wherein the MCU is operable to determine coordinate information for one or more of the video images in the composite video image, wherein the coordinate information includes information indicating a size of the composite video image;
   wherein the MCU is operable to scale the composite video image into a scaled composite video image;
   wherein the MCU is operable to transmit the scaled composite video image and the coordinate information to at least one video conferencing endpoint of the plurality of video conferencing endpoints;
   wherein the at least one video conferencing endpoint of the plurality of video conferencing endpoints is operable to receive the scaled composite video image and the coordinate information, detect an actual size of the scaled composite video image, and use the information indicating the size of the composite video image and the detected actual size of the scaled composite video image to determine new coordinates of one or more video images in the scaled composite video image.

2. The video conferencing system of claim 1, wherein the at least one video conferencing endpoint of the plurality of video conferencing endpoints is operable to generate a new composite video image using the new coordinates to separate one or more respective video images in the scaled composite video image and composite a new composite video image using at least one of the separated video images.

3. The video conferencing system of claim 2, wherein the at least one video conferencing endpoint is operable to display the new composite video image.

4. The video conferencing system of claim 2, wherein the new composite video image comprises at least one video image derived from local video of the at least one video conferencing endpoint.

5. The video conferencing system of claim 2, wherein the scaled composite video image from the MCU has a first layout and wherein the new composite video image has a second different layout.

6. The video conferencing system of claim 5, wherein the at least one video conferencing endpoint is further operable to receive user input selecting the second different layout.

7. The video conferencing system of claim 1, wherein the information indicating the size of the composite video image comprises a width and a vertical height of the composite video image.

8. The video conferencing system of claim 1, wherein the coordinate information and the size of the composite video image is comprised in metadata transmitted with a video frame comprising the scaled composite video image.

9. The video conferencing system of claim 8, wherein the metadata further includes identifying information for a video conferencing endpoint corresponding to the coordinate information of the video image.

10. The video conferencing system of claim 8, wherein the metadata further describes attributes of each of the plurality of video conferencing endpoints.

11. The video conferencing system of claim 8, wherein the at least one video conferencing endpoint is operable to display the metadata.

12. A method, comprising:
   receiving video images through at least one decoder from a plurality of video conferencing endpoints coupled to a multipoint control unit (MCU);
   generating a first composite video image comprised of at least two video images from respective video conferencing endpoints of the plurality of video conferencing endpoints;
   generating coordinate information including information indicating a size of the first composite video image and information on a location of a video image of the at least two video images within the first composite video image;
   scaling the first composite video image into a scaled composite video image; and transmitting the scaled composite video image and the coordinate information to at least one of the plurality of video conferencing endpoints;

wherein the at least one of the plurality of video conferencing endpoints is operable to receive the scaled composite video image and the coordinate information, detect an actual size of the scaled composite video image, and use the information indicating a size of the first composite video image and the detected size of the scaled composite video image to determine new coordinates of one or more video images in the scaled composite video image.

13. The method of claim 12, wherein the at least one of the plurality video conferencing endpoints is operable to generate a second composite video image using the new coordinates to separate at least one respective video image in the scaled composite video image and composite the second composite video image using at least one of the separated video images.

14. The method of claim 13, wherein the at least one of the plurality of video conferencing endpoints is operable to display the second composite video image.

15. The method of claim 13, wherein the second composite video image comprises at least one video image derived from local video of the at least one video conferencing endpoint.

16. The method of claim 13, wherein the scaled composite video image from the MCU has a first layout and wherein the second composite video image has a second different layout.

17. The method of claim 16, wherein the at least one video conferencing endpoint is further operable to receive user input selecting the second different layout.

18. The method of claim 12, wherein the information indicating the size of the first composite video image comprises a width and a vertical height of the first composite video image.

19. The method of claim 12, wherein the coordinate information and the size of the first composite video image is comprised in metadata transmitted with a video frame comprising the scaled composite video image.

20. The method of claim 19, wherein the metadata further includes identifying information for a video conferencing endpoint corresponding to the coordinate information of the video image.

21. The method of claim 19, wherein the metadata further describes attributes of each of the plurality of video conferencing endpoints.

22. The method of claim 19, wherein the at least one video conferencing endpoint is operable to display the metadata.

23. A computer-readable storage medium, comprising program instructions, wherein the program instructions are computer-executable to:

receive video images through at least one decoder from a plurality of video conferencing endpoints coupled to an MCU;

generate a first composite video image comprised of at least two video images from respective video conferencing endpoints of the plurality of video conferencing endpoints;

generate coordinate information including information indicating a size of the first composite video image and information on a location of a video image of the at least two video images within the first composite video image;

scale the first composite video image into a scaled composite video image; and transmit the scaled composite video image and the coordinate information to at least one of the plurality of video conferencing endpoints;

wherein the at least one of the plurality of video conferencing endpoints is operable to receive the scaled composite video image and the coordinate information, detect an actual size of the scaled composite video image, and use the information indicating the size of the first composite video image and the detected size of the scaled composite video image to determine new coordinates of one or more video images in the scaled composite video image.

24. The computer-readable storage medium of claim 23, wherein the at least one of the plurality video conferencing endpoints is operable to generate a second composite video image using the new coordinates to separate at least one respective video image in the scaled composite video image and composite the second composite video image using at least one of the separated video images.

25. The computer-readable storage medium of claim 23, wherein the information indicating the size of the first composite video image comprises a width and a vertical height of the first composite video image.

* * * * *